(12) United States Patent
Vuong (10) Patent No.: US 8,816,516 B2
(45) Date of Patent: Aug. 26, 2014

(54) APPARATUS FOR GENERATING ENERGY USING MECHANICAL ENERGY AND GRAVITATIONAL ENERGY

(76) Inventor: Anh Vuong, Garland, TX (US)

( * ) Notice: Subject to any disclaimer, the term of this patent is extended or adjusted under 35 U.S.C. 154(b) by 261 days.

(21) Appl. No.: 13/370,688

(22) Filed: Feb. 10, 2012

(65) Prior Publication Data

US 2012/0205916 A1 Aug. 16, 2012

Related U.S. Application Data

(60) Provisional application No. 61/441,342, filed on Feb. 10, 2011.

(51) Int. Cl.
*F02B 63/04* (2006.01)
*H02K 7/10* (2006.01)
*F03G 7/10* (2006.01)

(52) U.S. Cl.
CPC ............... *F03G 7/10* (2013.01); *Y02E 10/725* (2013.01); *Y02B 10/30* (2013.01)
USPC .......................................... 290/1 C; 290/1 R

(58) Field of Classification Search
USPC ................................................ 290/1 C, 1 R
See application file for complete search history.

(56) References Cited

U.S. PATENT DOCUMENTS

| | | | | |
|---|---|---|---|---|
| 3,250,140 A | * | 5/1966 | Russell | 74/126 |
| 2005/0248159 A1 | * | 11/2005 | Seoane | 290/1 R |
| 2011/0115236 A1 | * | 5/2011 | Blevins | 290/1 C |
| 2013/0207403 A1 | * | 8/2013 | Eichhorn | 290/1 R |
| 2013/0221680 A1 | * | 8/2013 | Mian et al. | 290/1 R |

FOREIGN PATENT DOCUMENTS

| | | | | |
|---|---|---|---|---|
| CN | 202954932 | * | 5/2013 | F03G 7/08 |
| JP | 56027075 A | * | 3/1981 | F03B 13/12 |
| JP | 3145638 | * | 10/2008 | H02K 7/18 |

* cited by examiner

*Primary Examiner* — Tulsidas C Patel
*Assistant Examiner* — Thomas Quigley (57) ABSTRACT

An apparatus for generating energy using mechanical energy and gravitational energy comprises a generator, a plurality of free wheels, a first pulling mechanism, a second pulling mechanism, and a battery. The generator and the plurality of free wheels are connected by a turbine shaft. The first pulling mechanism and the second pulling mechanism are connected to the plurality of free wheels. Each plurality of free wheels comprises a rod which oscillate forward and backward turning the plurality of free wheels. Since the turbine shaft is connected with the plurality of free wheels and the generator, the generator rotates simultaneously with the plurality of free wheels. As a result, the generator produced energy which is converted into electricity.

13 Claims, 9 Drawing Sheets

APPARATUS FOR GENERATING ENERGY USING MECHANICAL ENERGY AND GRAVITATIONAL ENERGY

The current application claims a priority to the U.S. Provisional Patent application Ser. No. 61/441,342 filed on Feb. 10, 2011.

FIELD OF THE INVENTION

The present invention relates generally to an apparatus for generating energy. More particularly, the present invention generates energy, converting gravitational energy into mechanical energy using a system of pendulums. The mechanical energy is then converted into electrical energy using a free wheel set and a wind turbine generator.

BACKGROUND OF THE INVENTION

A pendulum is a mass or weight suspended about a pivot point. An ideal pendulum comprises a mass-less rod connecting the mass to the pivot and a frictionless pivot. A pendulum at resting position is said to be in equilibrium position, having a net force of zero acting on the mass. When the mass is lifted and released, a restoring force is applied to move the mass back into equilibrium position. Combining the mass with the restoring force, the pendulum is forced to oscillate. An actual pendulum comprises a rod with a mass and friction forces at the pivot and from its contact with the air, which cause the pendulum to eventually come to a stop. Pendulums have long been used to convert its gravitational energy into mechanical energy, most notably in driving pendulum clocks, making use of the inexhaustibility and inexpensive cost of gravity. However, converting gravitational energy into electrical energy is a relatively new concept. Recycling energy and converting it into electrical energy can provide families and households cheap and efficient power for daily operations. It is therefore an object of the present invention to introduce a system of pendulums for converting gravitational energy into mechanical energy and subsequently into electrical energy using a free wheel set and a wind turbine generator.

DETAIL DESCRIPTIONS OF THE INVENTION

All illustrations of the drawings are for the purpose of describing selected versions of the present invention and are not intended to limit the scope of the present invention.

Figure 1:
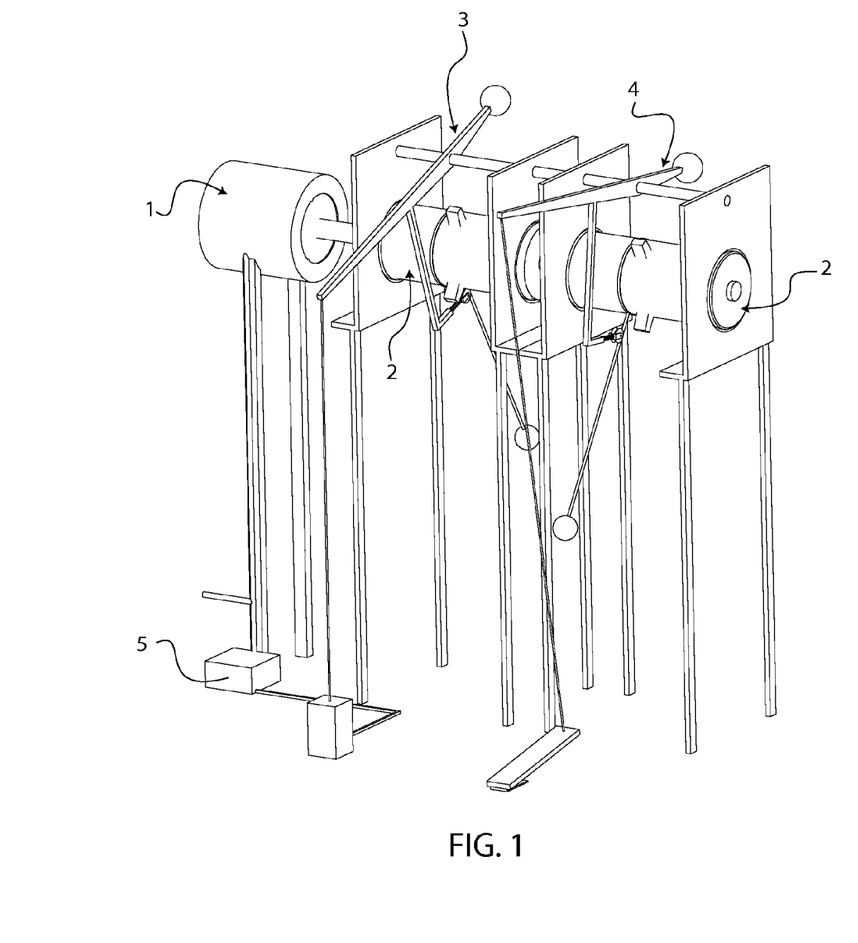
FIG. 1 is a perspective view of the present invention.
Figure 2:
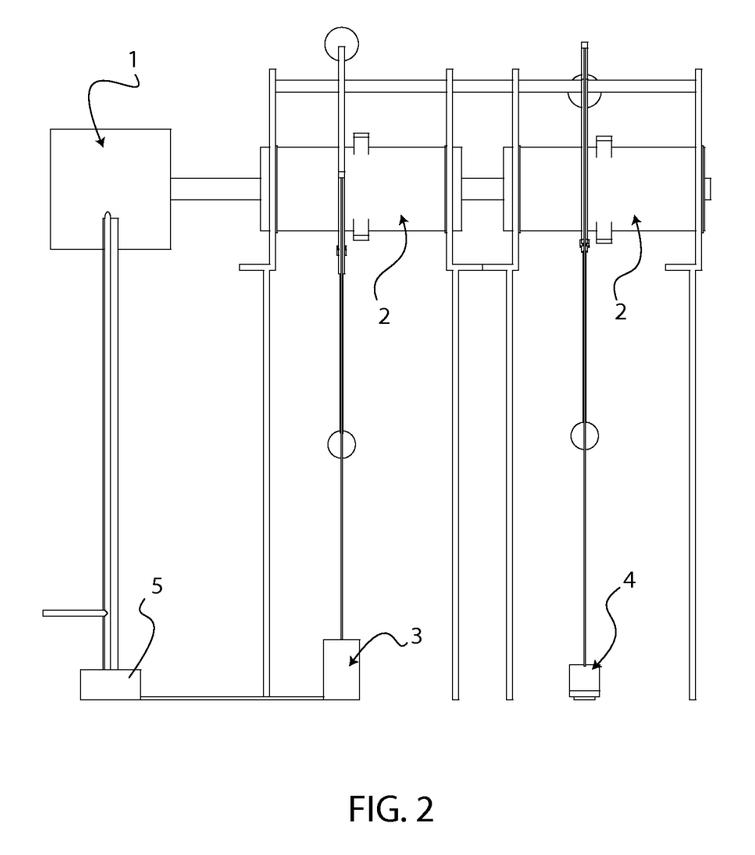
FIG. 2 is front view of the present invention.
Figure 3:
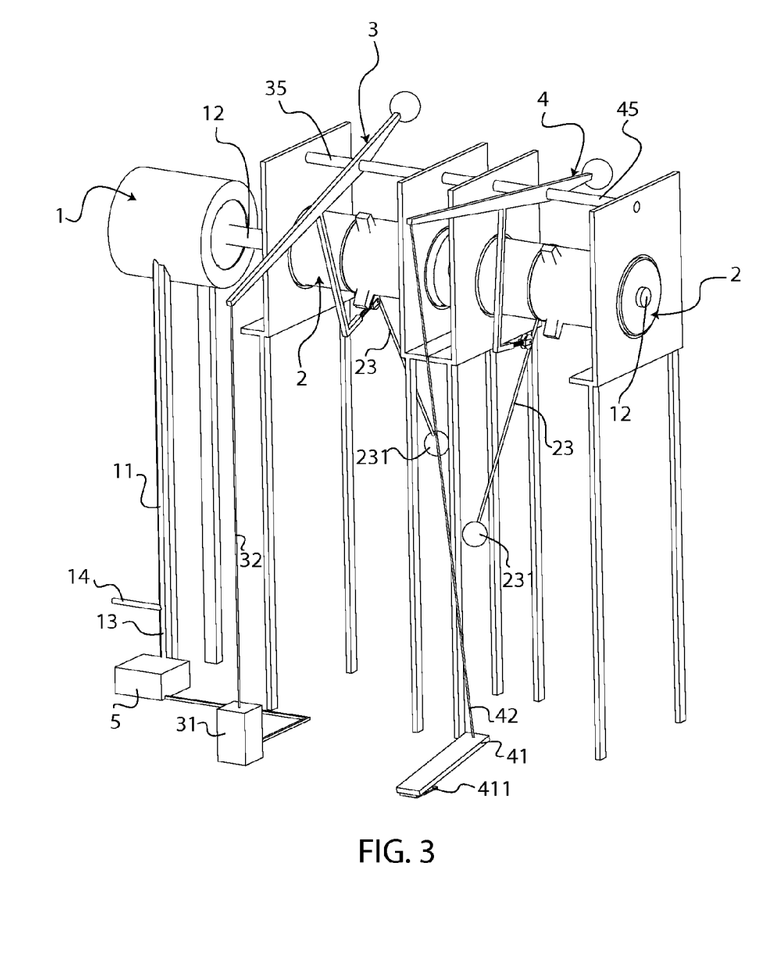
FIG. 3 is a perspective view of the present invention.

The present invention converts gravitational energy into electrical energy. The present invention is based on the movement of pendulums. Mechanical energy created by the pendulums is transformed into the electrical energy. The present invention comprises a generator 1, a plurality of free wheels 2, a first pulling mechanism 3, a second pulling mechanism 4, and a battery 5.

The generator 1 comprises a generator tower 11, a turbine shaft 12, a first power output 13, and a second power output 14. The generator 1 used in the present invention is similar to a regular wind generator. There is one main difference between the generator 1 used in the present invention compare to a traditional wind generator. The generator 1 used in the present invention is equipped without hovering blades. The turbine shaft 12 is concentrically connected to the generator 1 and extended from one end. The extended turbine shaft 12 is connected to the plurality of free wheels 2. The generator tower 11 is positioned under the generator 1 and supports the weight 231 of the generator 1. The generator tower 11 is made out of steel and either painted with an aesthetically pleasing color or coated with zinc alloy for the protection. The turbine shaft 12 is also made out of steel like material which can withstand the constant rotation. The first power output 13 and the second power output 14 are electronically connected with the generator 1. The first power output 13 and the second power output 14 both supply the generated electricity from the generator 1. The first power output 13 is connected with the battery 5 from the other end. The battery 5 is positioned next to the generator tower 11. The second power output 14 is designed as an open end. The second power output 14 supplies the net generated energy from the present invention.

Each of the plurality of free wheels 2 comprises a cylinder 21, a gear 22, a cylinder rod 23, and a plurality of cylinder holders 24. The cylinder 21 is positioned around the gear 22. The cylinder 21 comprises a plurality of cavities 211, a plurality of springs 212, a plurality of pins 213, a plurality of cylinder teeth 214, and a plurality of connecting pins 215. The plurality of cavities 211 is positioned at the inside surface of the cylinder 21. The plurality of springs 212 is concentrically positioned inside the plurality of cavities 211. The plurality of pins 213 is positioned under the plurality of springs 212. Pin head of the plurality of pins 213 is positioned inside the plurality of cavities 211 and the bottom end of the plurality of pins 213 is extended out from the plurality of cavities 211 and into the cylinder 21. Since the bottom diameter of the plurality of cavities 211 is smaller than the pin head diameter, the plurality of pins 213 stays within the plurality of cavities 211 and does not separate into the cylinder 21. The plurality of springs 212 provides a spring force which forces the plurality of pins 213 downward. The plurality of cylinder teeth 214 is positioned under the plurality of pins 213. The plurality of cylinder teeth 214 is connected to the cylinder 21 by the plurality of connecting pins 215. The plurality of connecting pins 215 is traversed through a pair of cylinder holes and a cylinder teeth hole so the plurality of cylinder teeth 214 can rotate around the plurality of connecting pins 215. The rotation of the plurality of cylinder teeth 214 is restricted by the plurality of pins 213 and the gear 22 from top and bottom respectively.

Figure 4:
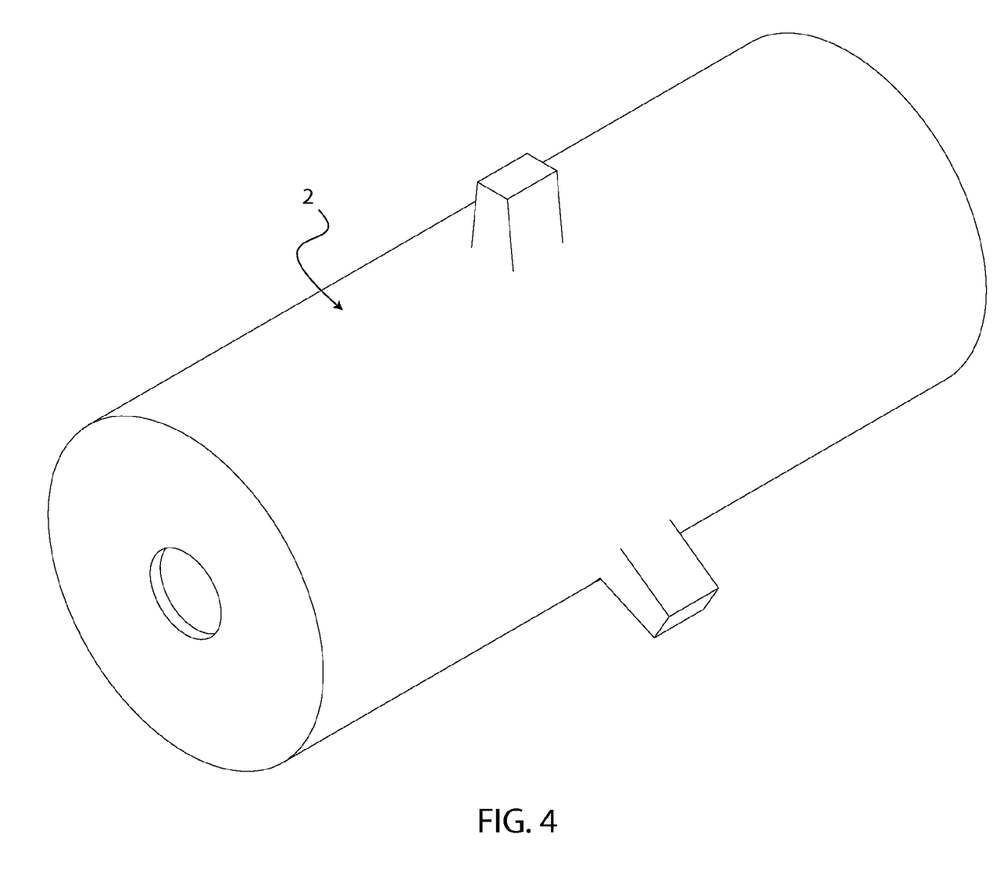
FIG. 4 is a perspective view of a free wheel unit in the present invention.
Figure 5:
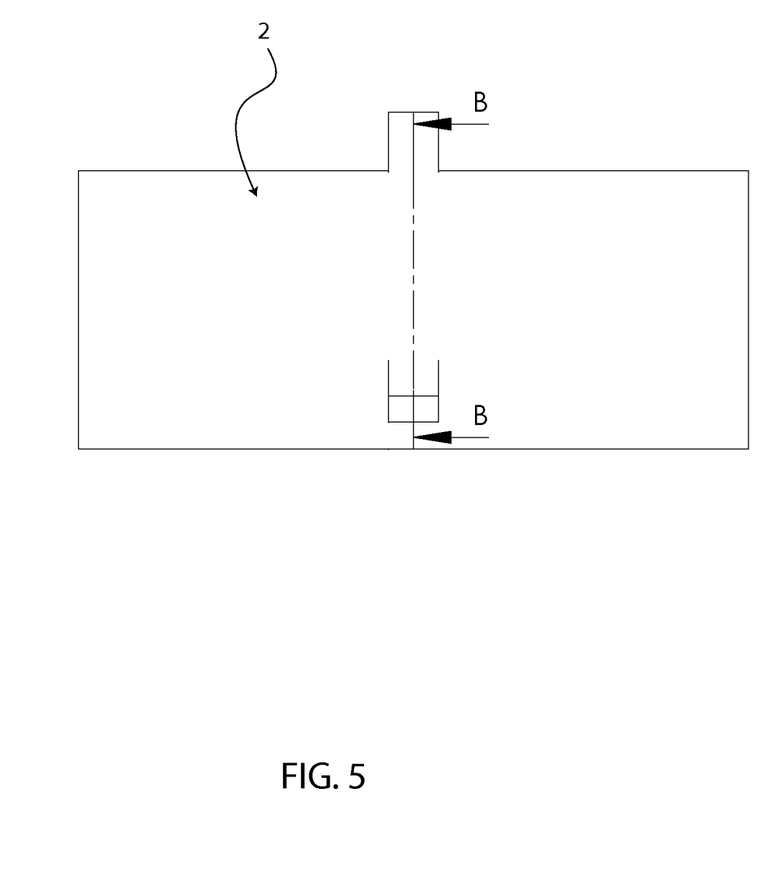
FIG. 5 is a side view of the free wheel unit in the present invention.
Figure 6:
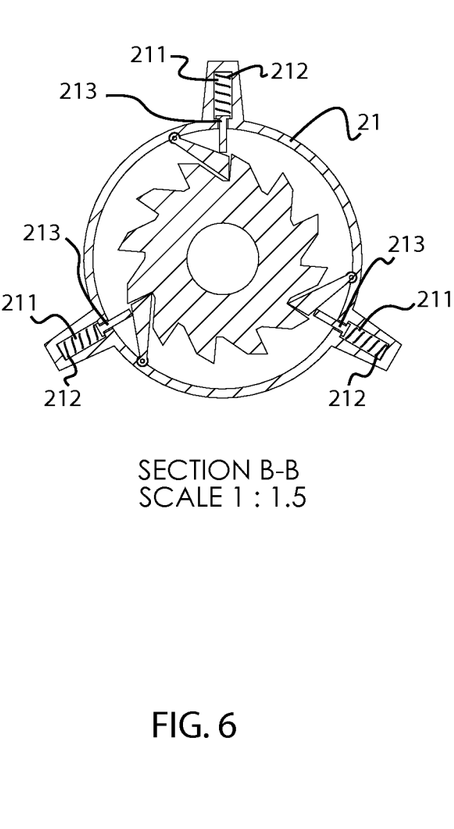
FIG. 6 is a middle cross section view of the FIG. 5.
Figure 7:
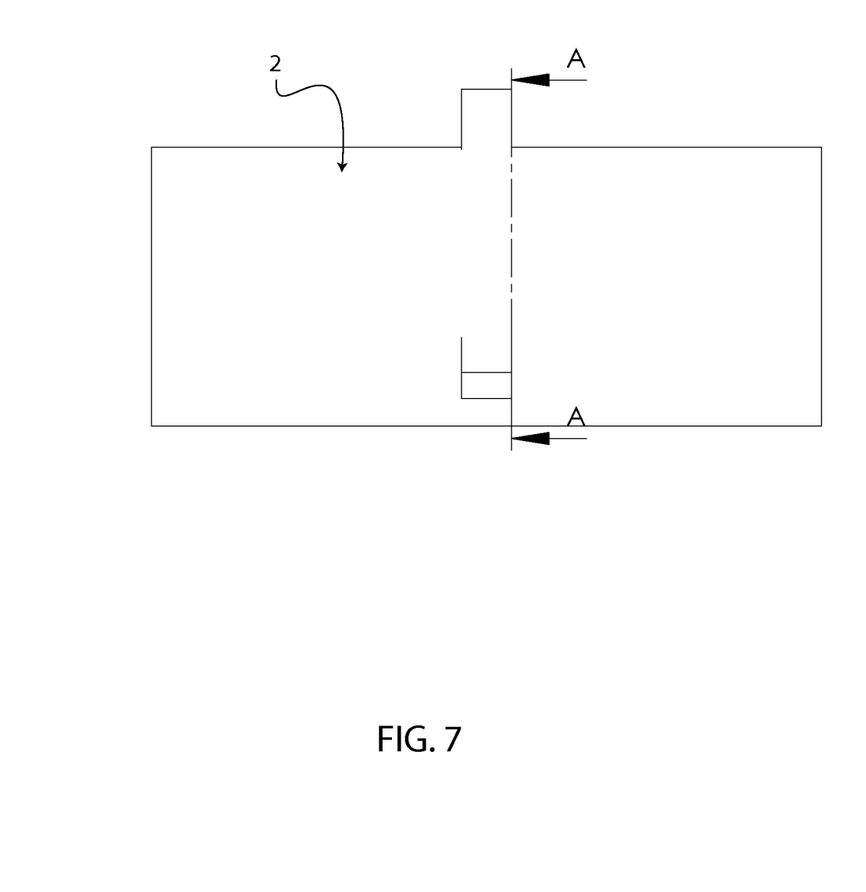
FIG. 7 is a side view of the free wheel unit in the present invention.
Figure 8:
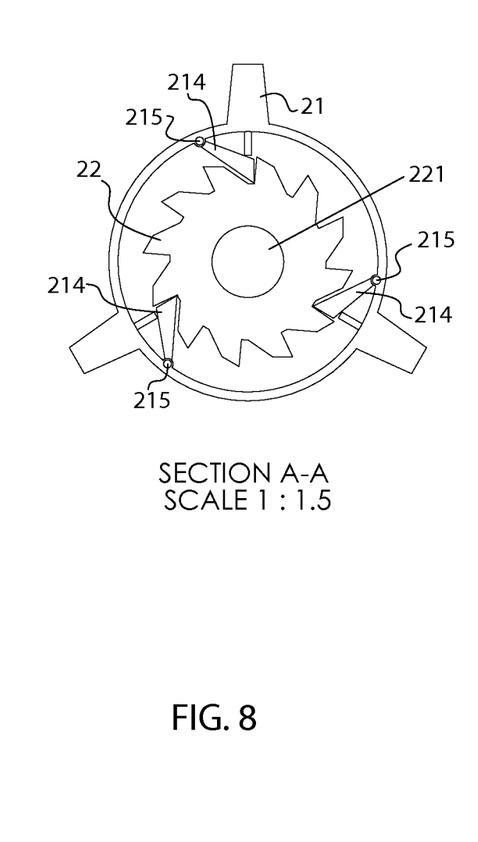
FIG. 8 is an off centered cross section view of the FIG. 7 showing connective pins.

The gear 22 is positioned concentric with the cylinder 21. The gear 22 comprises a gear hole 221. The gear hole 221 is concentrically positioned within the gear 22. The plurality of cylinder teeth 214 is positioned between two gear 22 teeth. The turbine shaft 12 is inserted through the gear hole 221 so the plurality of free wheels 2 is connected with the generator 1. The turbine shaft 12 and the gear 22 are fixed together so the gear 22 and the turbine shaft 12 rotate simultaneously. The cylinder rod 23 is connected to the cylinder 21 and comprises a weight 231. The cylinder rod 23 is fixed to the cylinder 21 so the cylinder rod 23 and the cylinder 21 oscillate concurrently around the gear 22.

Figure 9:
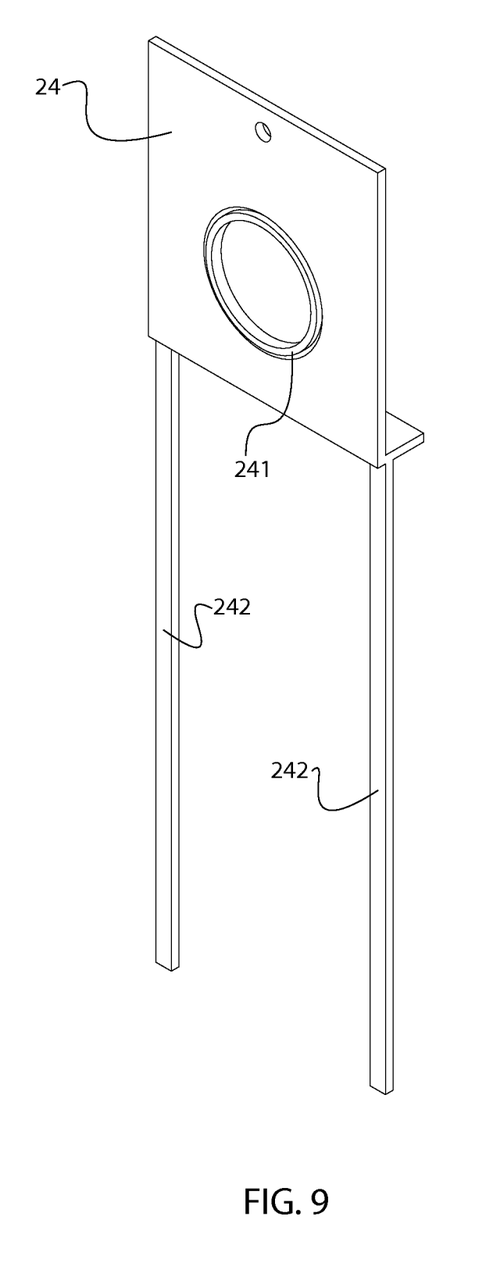
FIG. 9 is a perspective view of a free wheel unit holder in the present invention.

The plurality of cylinder holders 24 is positioned at front and back end of the plurality of free wheels 2. Each of the plurality of cylinder holders 24 comprises a bearing 241 and a plurality of supporting rods 242. The bearing 241 is centrally positioned in the plurality of cylinder holders 24. The cylinder 21 is inserted into the bearing 241 and connected with in the inside surface of the bearing 241. The bearing 241 reduces the friction between the oscillating cylinder 21 and the plurality of cylinder holders 24. The plurality of supporting rods 242 is connected to the plurality of cylinder holders 24 from below. The plurality of supporting rods 242 provides the necessary support needed for the plurality of cylinder holders 24 so the plurality of free wheels 2 is secured. All components in the plurality of free wheels 2 are made out of steel so the components are able to function for extended period without any complications.

Figure 10:
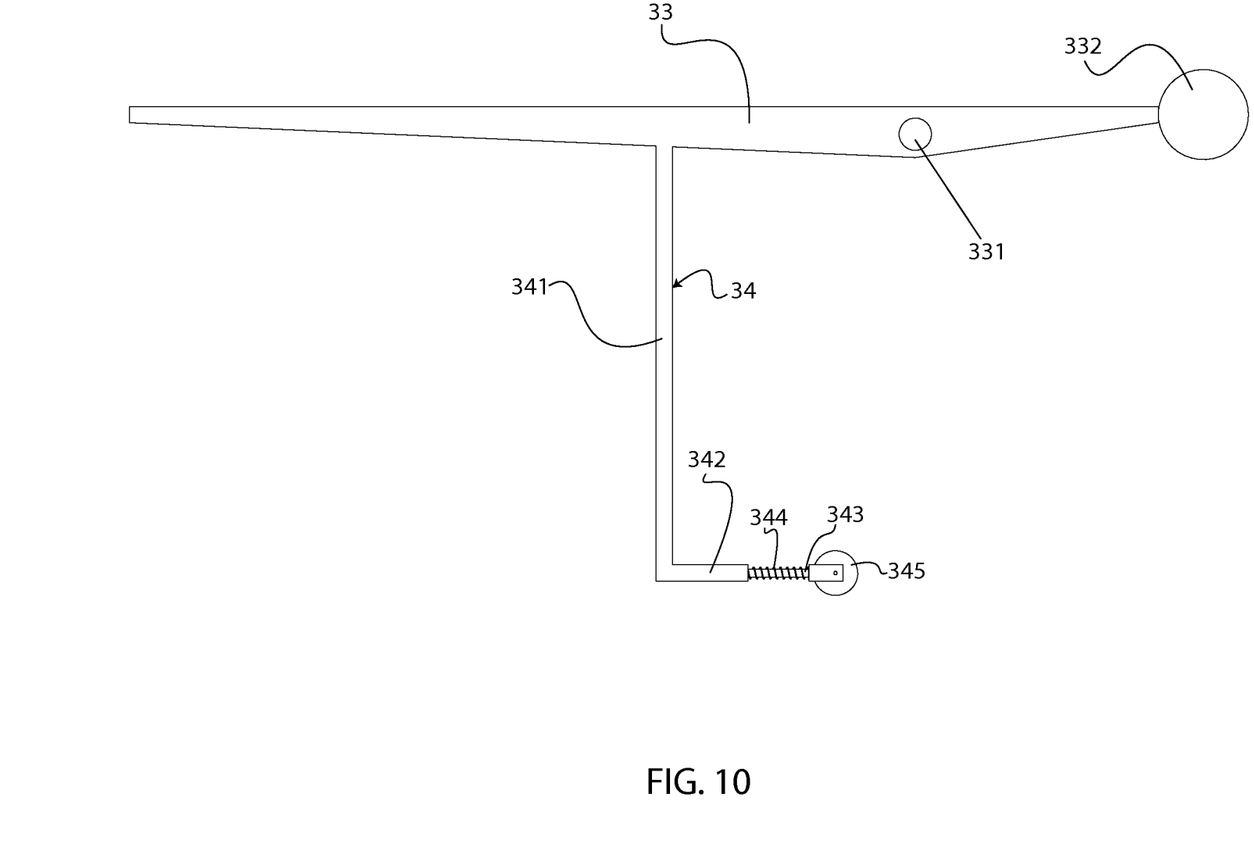
FIG. 10 is a front view of a first pressing bar in the present invention.

The first pulling mechanism 3 comprises a pulling device 31, a first pulling cable 32, a first pressing bar 33, a first pushing rod 34, and a first pivoting rod 35. The pulling device 31 is connected to the first pulling cable 32. The pulling device 31 is powered by the battery 5. The battery 5 is constantly charged by the first power output 13. The first pulling cable 32 is connected to the first pressing bar 33. The first pressing bar 33 comprises a first pivot hole 331 and a first balance weight 332. The first pivot hole 331 positioned in the middle of the first pressing bar 33. The first balance weight 332 is connected to the first pressing bar 33 opposite from the first pulling cable 32. The first pushing rod 34 is positioned under the first pressing bar 33 behind the first pivot hole 331. The first pushing rod 34 comprises a first vertical rod 341, a first horizontal rod 342, a first wheel connector 343, a first spring 344, and a first wheel 345. The first vertical rod 341 is perpendicularly connected to the first pressing bar 33. The first horizontal rod 342 is perpendicularly connected to the first vertical rod 341 from an end. The first horizontal rod 342 is positioned parallel to the first pressing bar 33 and extended toward the first balance weight 332. The first wheel connector 343 is inserted into a hole at the free end of the first horizontal rod 342. The first spring 344 is inserted around the first wheel connector 343 and the first wheel 345 is connected to the first wheel connector 343 opposite from the first horizontal rod 342. The first pivoting rod 35 is inserted through the first pivot hole 331 and connected to the plurality of cylinder holders 24. All components in the first pulling mechanism 3 are made out of steel for proper functionality.

When the pulling device 31 pulls the first pulling cable 32, back end of the first pressing bar 33 rotate towards the pulling device 31 making the first balance weight 332 moves upward. Because of the first pressing bar 33 rotation, the first pushing rod 34 moves forward and contacts with the cylinder rod 23. Upon the connection with the cylinder rod 23, the first wheel connector 343 and the first spring 344 absorb most of the impact pressure created on the first pushing rod 34 creating a smooth transaction. Then the cylinder rod 23 moves upward along with the first pushing rod 34 and rotates the cylinder 21 counter clockwise. When the cylinder rod 23 reaches its optimal position, the pulling device 31 is automatically switched into its neutral positioned. Since there is zero force provided by the pulling device 31, gravity acts on the first balance weight 332 and moves the first balance weight 332 downward. While the first balance weight 332 moves downward, the first pushing rod 34 separates from the cylinder rod 23 and moves backward. Then the gravity acts on the weight 231 and moves the weight 231 and the cylinder rod 23 downward simultaneously. Because of the cylinder rod 23 movement, the cylinder 21 rotates clockwise. When the cylinder rod 23 moves back to its starting position, a complete oscillating cycle is performed. The backward movements of the first push rod 34 and the clockwise movements of the cylinder rod 23 are completely independent from each other and two components never collide into each other.

Figure 11:
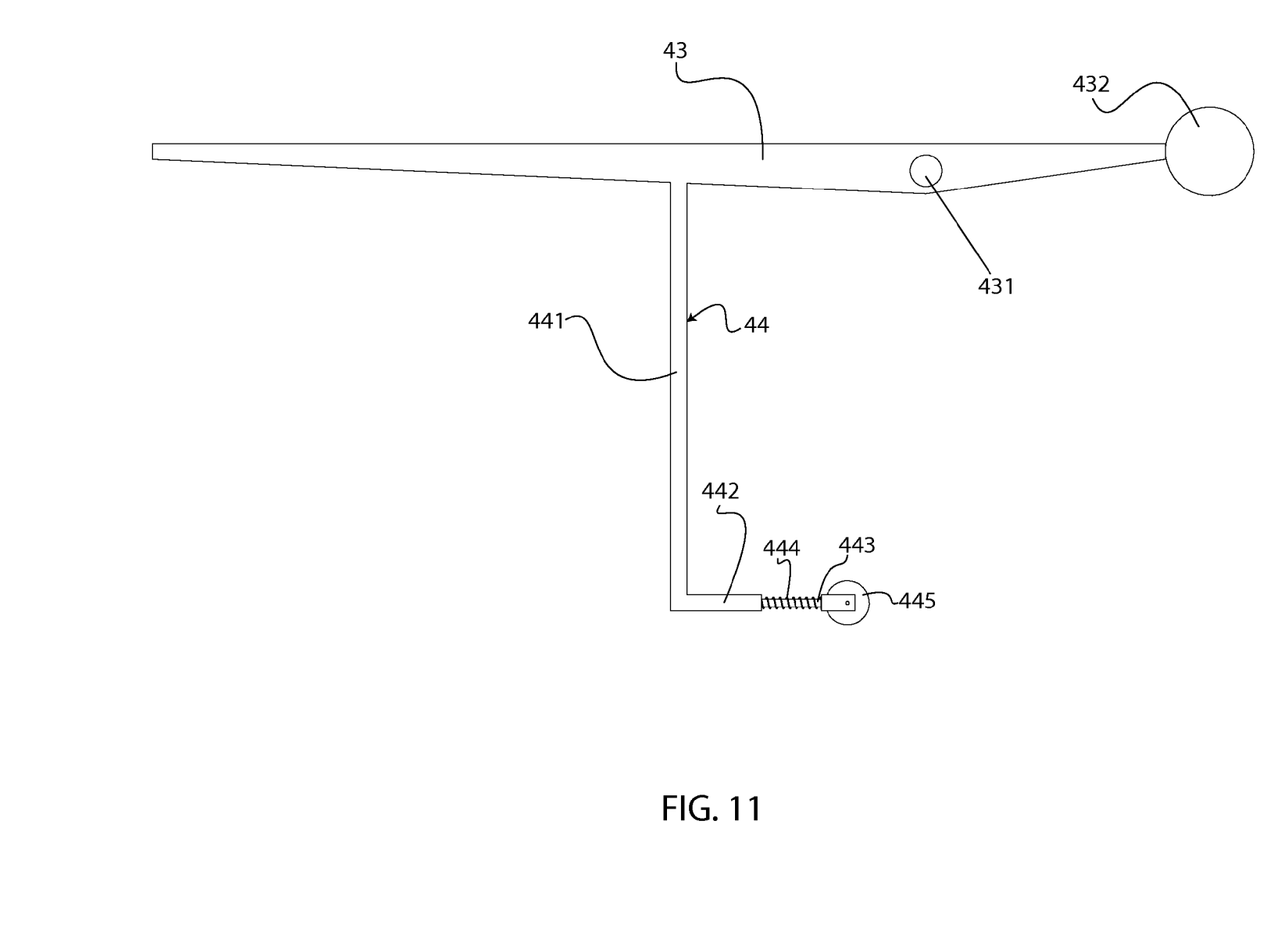
FIG. 11 is a front view of a second pressing bar in the present invention.

The second pulling mechanism 4 is completely powered by a walking person. The second pulling method is an environmental friendly process which reduces the carbon foot prints and at the same time creates more jobs. The second pulling mechanism 4 comprises a stepping board 41, a second pulling cable 42, a second pressing bar 43, a second pushing rod 44, and a second pivoting rod 45. The stepping board 41 is connected to the second pulling cable 42 from one end. The stepping board 41 also comprises a hinge which connects between the stepping board 41 and ground surface opposite from the second pulling cable 42. The second pulling cable 42 is connected to the second pressing bar 43. The second pressing bar 43 comprises a second pivot hole 431 and a second balance weight 432. The second pivot hole 431 positioned in the middle of the second pressing bar 43. The second balance weight 432 is connected to the second pressing bar 43 opposite from the second pulling cable 42. The second pushing rod 44 is positioned under the second pressing bar 43 behind the second pivot hole 431. The second pushing rod 44 comprises a second vertical rod 441, a second horizontal rod 442, a second wheel connector 443, a second spring 444, and a second wheel 445. The second vertical rod 441 is perpendicularly connected to the second pressing bar 43. The second horizontal rod 442 is perpendicularly connected to the second vertical rod 441 from an end. The second horizontal rod 442 is positioned parallel to the second pressing bar 43 and extended toward the second balance weight 432. The second wheel connector 443 is inserted into a hole at the free end of the second horizontal rod 442. The second spring 444 is inserted around the second wheel connector 443 and the second wheel 445 is connected to the second wheel connector 443 opposite from the second horizontal rod 442. The second pivoting rod 45 is inserted through the second pivot hole 431 and connected to the plurality of cylinder holders 24. All components in the second pulling mechanism 4 are made out of steel for proper functionality.

After a person steps on the stepping board 41, the stepping board 41 moves toward the ground surface due to the weight of the person. While the stepping board 41 moves downward, the stepping board 41 pulls the second pulling cable 42. Because of the second pulling cable movement, back end of the second pressing bar 43 rotates towards the stepping board 41 making the second balance weight 432 moves upward. Because of the second pressing bar 43 rotation, the second pushing rod 44 moves forward and contacts with the cylinder rod 23. Upon the connection with the cylinder rod 23, the second wheel connector 443 and the second spring 444 absorb most of the impact pressure created on the second pushing rod 44 creating a smooth transaction. Then the cylinder rod 23 moves upward along with the second pushing rod 44 and rotates the cylinder 21 counter clockwise. When the cylinder rod 23 reaches its optimal position, the stepping board 41 is automatically switched into its neutral positioned or the person gets off from the stepping board 41. Since there is zero force provided by the stepping board 41, gravity acts on the second balance weight 432 and moves the second balance weight 432 downward. While the second balance weight 432 moves downward, the second pushing rod 44 separates from the cylinder rod 23. Then the gravity acts on the weight 231 and moves the weight 231 and the cylinder rod 23 downward simultaneously. Because of the cylinder rod 23 movement, the cylinder 21 rotates clockwise. When the cylinder rod 23 moves back to its starting position, another complete oscillating cycle is performed. The backward movements of the second push rod 44 and the clockwise movements of the cylinder rod 23 are completely independent from each other and two components never collide into each other.

The plurality of cylinder teeth 214 is designed with specific angles around the each component with respect to the gear 22 and the plurality of cylinder teeth 214 has two different functionalities. As the first functionality, the plurality of cylinder teeth 214 glides around the gear 22 teeth, when the cylinder 21 rotates counter clockwise. As the second functionality, the plurality of cylinder teeth 214 engages with the gear 22 teeth, when the cylinder 21 rotates clockwise. For example, when the cylinder 21 rotates counter clockwise, the cylinder 21 glides around the stationary gear 22 and the plurality of cylinder teeth 214 moves up and down but never engaged with the gear 22 teeth. As a result, the cylinder 21 rotates counter clockwise but the gear 22 does not rotate. On the other hand, when the cylinder 21 rotates clockwise, the gear 22 rotates simultaneously with the cylinder 21 because the plurality of cylinder teeth 214 is now engaged between the gear 22 teeth. Since the gear 22 is connected with the turbine shaft 12, the turbine shaft 12 also rotates along with the gear 22 generating electricity. Each oscillating complete cycle successfully converts the mechanical energy into electrical energy via the generator 1. The plurality of free wheels 2 operates independently from each other and the plurality of free wheels 2 in the present invention depends on the efficiency of the system and its not limited two units.

Although the invention has been explained in relation to its preferred embodiment, it is to be understood that many other possible modifications and variations can be made without departing from the spirit and scope of the invention as hereinafter claimed.

What is claimed is:

1. An apparatus for generating energy using mechanical energy and gravitational energy comprises,
   a generator;
   a plurality of free wheels;
   a first pulling mechanism;
   a second pulling mechanism;
   a battery;
   the generator comprises a generator tower, a turbine shaft, a first power output, and a second power output;
   each of the plurality of free wheels comprises a cylinder, a gear, a cylinder rod, and a plurality of cylinder holders;
   the first pulling mechanism comprises a pulling device, a first pulling cable, a first pressing bar, a first pushing rod, a first balance weight, and a first pivoting rod;
   the second pulling mechanism comprises a stepping board, a second pulling cable, a second pressing bar, a second pushing rod, a second balance weight, and a second pivoting rod;
   wherein the operation of the first pulling mechanism by pulling the first pulling cable causes the turbine shaft to rotate in a counterclockwise direction thereby raising the potential energy of the first balance weight and releasing of the first pulling mechanism cause the turbine shaft to rotate in a clockwise direction thereby converting the potential energy into electrical energy; and
   wherein the operation of the second pulling mechanism by pulling the second pulling cable causes the turbine shaft to rotate in a counterclockwise direction thereby raising the potential energy of the second balance weight and releasing of the second pulling mechanism cause the turbine shaft to rotate in a clockwise direction thereby converting the potential energy into electrical energy.

2. The apparatus for generating energy using mechanical energy and gravitational energy as claimed in claim 1 comprises,
   the generator tower being positioned under the generator;
   the turbine shaft being concentrically connected to the generator;
   the turbine shaft being inserted into the plurality of free wheels;
   the first power output and the second power output being electronically connected to the generator;
   the first power output being electronically connected with the battery; and
   the second power output being electronically connected with an external power source.

3. The apparatus for generating energy using mechanical energy and gravitational energy as claimed in claim 1 comprises,
   the gear being concentrically inserted into the cylinder;
   the cylinder rod being perpendicularly positioned below the cylinder;
   the cylinder rod being connected to the cylinder;
   the plurality of cylinder holders being positioned around the front end of the cylinder; and
   the plurality of cylinder holders being positioned around the back end of the cylinder.

4. The apparatus for generating energy using mechanical energy and gravitational energy as claimed in claim 3 comprises,
   the cylinder comprises a plurality of cavities, a plurality of springs, a plurality of pins, a plurality of cylinder teeth, and a plurality of connecting pins;
   the plurality of cavities being extended into the cylinder;
   plurality of springs being positioned inside the plurality of cavities;
   plurality of pins being inserted into the plurality of cavities;
   plurality of pins being connected with the plurality of springs;
   the plurality of cylinder teeth being positioned inside the cylinder;
   the plurality of connecting pins jointly connected the plurality of cylinder teeth to the cylinder;
   the gear comprises a gear hole;
   the gear hole being centrally positioned in the gear;
   the plurality of cylinder teeth being positioned around the gear; and
   the turbine shaft being inserted through the gear hole and connected to the gear.

5. The apparatus for generating energy using mechanical energy and gravitational energy as claimed in claim 3 comprises,
   each of the plurality of cylinder holders comprises a bearing and a plurality of supporting rods;
   the bearing being centrally positioned in the plurality of cylinder holders; and
   the plurality of supporting rods being positioned under the plurality of cylinder holders.

6. The apparatus for generating energy using mechanical energy and gravitational energy as claimed in claim 1 comprises,
   the pulling device being connected with the first pulling cable;

the first pulling cable being jointly connected to the first pressing bar;

the first pressing bar comprises a first pivot hole;

the first balance weight being connected to the first pressing bar opposite from the first pulling cable;

the first pushing rod being connected to the first pressing bar from below; and the first pivoting rod being inserted into through the first pivot hole.

7. The apparatus for generating energy using mechanical energy and gravitational energy as claimed in claim 1 comprises, the first pivoting rod being connected with the plurality of cylinder holders; and the pulling device being electronically connected with the battery.

8. The apparatus for generating energy using mechanical energy and gravitational energy as claimed in claim 1 comprises, the first pushing rod comprises a first vertical rod, a first horizontal rod, a first wheel connector, a first spring, and a first wheel;

the first vertical rod being perpendicularly connected to the first pressing bar;

the first horizontal rod being perpendicularly connected to the first vertical rod;

the first wheel connector being jointly connected to the first horizontal rod;

the first spring being inserted around the first wheel connector; and the first wheel being connected to the first wheel connector.

9. The apparatus for generating energy using mechanical energy and gravitational energy as claimed in claim 1 comprises, the stepping board comprises a hinge;

the hinge being connected to the stepping board from an end;

the stepping board being connected with the second pulling cable from the opposite end;

the second pulling cable being jointly connected to the second pressing bar;

the second pressing bar comprises a second pivot hole;

the second balance weight being connected to the second pressing bar opposite from the second pulling cable;

the second pushing rod being connected to the second pressing bar from below; and the second pivoting rod being inserted into through the second pivot hole.

10. The apparatus for generating energy using mechanical energy and gravitational energy as claimed in claim 1 comprises, the second pivoting rod being connected with the plurality of cylinder holders.

11. The apparatus for generating energy using mechanical energy and gravitational energy as claimed in claim 1 comprises, the second pushing rod comprises a second vertical rod, a second horizontal rod, a second wheel connector, a second spring, and a second wheel;

the second vertical rod being perpendicularly connected to the second pressing bar;

the second horizontal rod being perpendicularly connected to the second vertical rod;

the second wheel connector being jointly connector to the second horizontal rod;

the second spring being inserted around the second wheel connector; and the second wheel being connected to the second wheel connector.

12. The apparatus for generating energy using mechanical energy and gravitational energy as claimed in claim 1 comprises, the first pushing rod being in contact with the cylinder rod for one of the plurality of free wheels by the first wheel.

13. The apparatus for generating energy using mechanical energy and gravitational energy as claimed in claim 1 comprises, the second pushing rod being in contact with the cylinder rod for one of the plurality of free wheels by the second wheel.

* * * * *